United States Patent
Holzer et al.

(10) Patent No.: US 10,070,154 B2
(45) Date of Patent: Sep. 4, 2018

(54) CLIENT-SERVER COMMUNICATION FOR LIVE FILTERING IN A CAMERA VIEW

(71) Applicant: Fyusion, Inc., San Francisco, CA (US)

(72) Inventors: Stefan Johannes Josef Holzer, San Mateo, CA (US); Matteo Munaro, San Francisco, CA (US); Abhishek Kar, Berkeley, CA (US); Alexander Jay Bruen Trevor, San Francisco, CA (US); Krunal Ketan Chande, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 15/427,027

(22) Filed: Feb. 7, 2017

(65) Prior Publication Data

US 2018/0227601 A1   Aug. 9, 2018

(51) Int. Cl.
| H04N 7/173 | (2011.01) |
| H04N 21/2187 | (2011.01) |
| H04N 21/4223 | (2011.01) |
| H04N 21/234 | (2011.01) |

(52) U.S. Cl.
CPC ... *H04N 21/2187* (2013.01); *H04N 21/23418* (2013.01); *H04N 21/4223* (2013.01)

(58) Field of Classification Search
None
See application file for complete search history.

(56) References Cited

U.S. PATENT DOCUMENTS

| 9,665,331 | B2 * | 5/2017 | Spencer | G06F 3/1423 |
| 9,773,524 | B1 * | 9/2017 | Oh | G11B 27/034 |
| 2003/0149983 | A1 * | 8/2003 | Markel | H04N 7/088 725/51 |
| 2004/0150663 | A1 * | 8/2004 | Kim | G06F 17/30017 715/723 |
| 2008/0046925 | A1 * | 2/2008 | Lee | G06F 17/30817 725/37 |
| 2011/0282906 | A1 * | 11/2011 | Wong | G06F 17/30831 707/780 |
| 2011/0311199 | A1 * | 12/2011 | Fay | G11B 27/034 386/241 |
| 2013/0031582 | A1 * | 1/2013 | Tinsman | H04N 21/2353 725/36 |
| 2014/0123041 | A1 * | 5/2014 | Morse | G11B 27/031 715/765 |
| 2015/0139615 | A1 * | 5/2015 | Hill | H04N 21/2743 386/285 |
| 2015/0281710 | A1 * | 10/2015 | Sievert | H04N 19/164 375/240.02 |
| 2016/0006946 | A1 * | 1/2016 | Cohen | G06F 19/326 348/660 |
| 2017/0255440 | A1 * | 9/2017 | Spencer | H04L 65/403 |

* cited by examiner

*Primary Examiner* — An Son Phi Huynh
(74) *Attorney, Agent, or Firm* — Kwan & Olynick LLP

(57) ABSTRACT

Provided are mechanisms and processes for performing live filtering in a camera view via client-server communication. In one example, a first video frame in a raw video stream is transmitted from a client device to a server. The client device receives a filter processing message associated with the first video frame that includes filter data for applying a filter to the first video frame. A processor at the client device creates a filtered video stream by applying the filter to a second video frame that occurs in the video stream later than the first video frame.

11 Claims, 11 Drawing Sheets

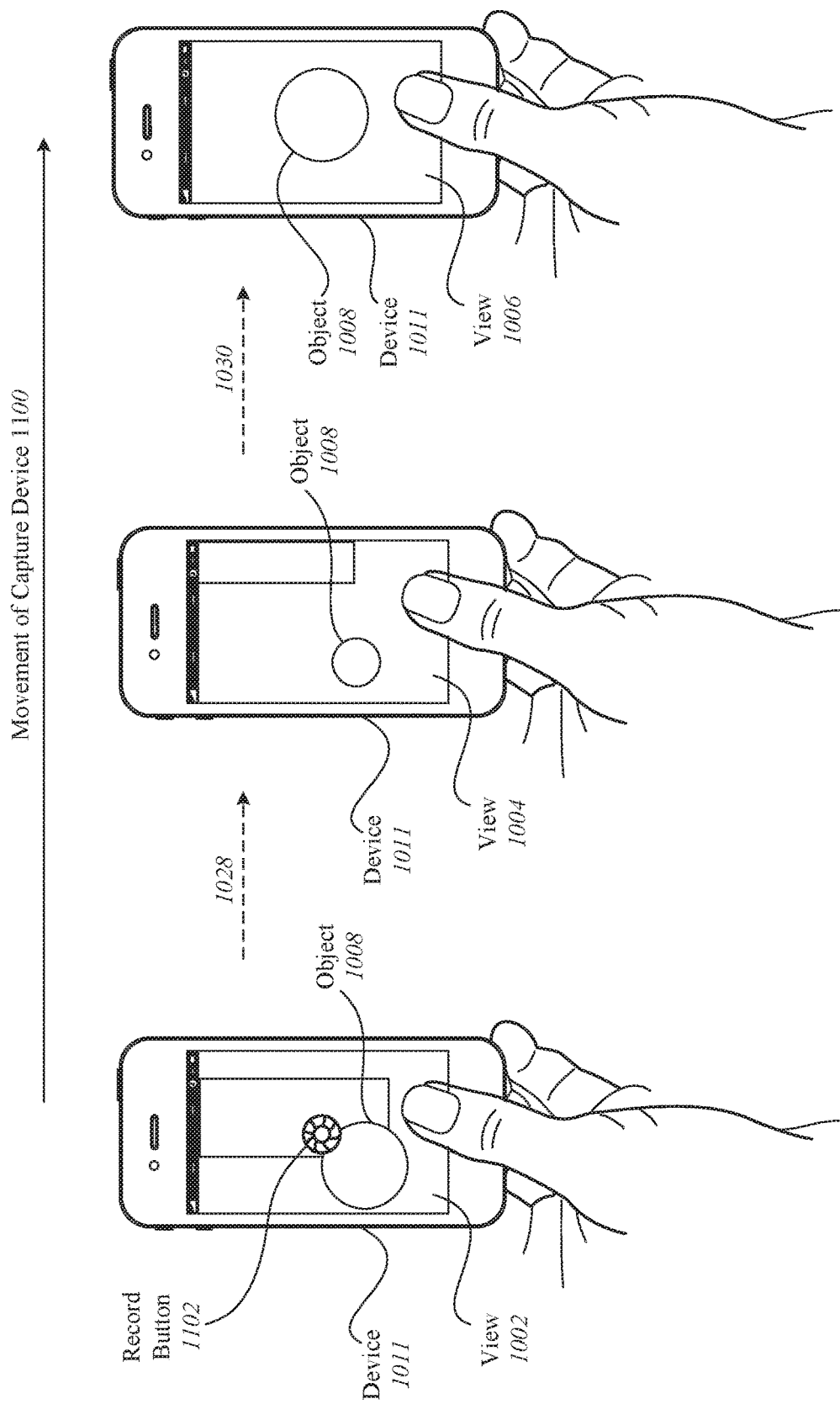

CLIENT-SERVER COMMUNICATION FOR LIVE FILTERING IN A CAMERA VIEW

TECHNICAL FIELD

The present disclosure relates to the application of live filtering to a camera view via client-server communication.

DESCRIPTION OF RELATED ART

Images captured by cameras are commonly modified by applying visual filters. For example, a visual filter may sharpen, blur, or emboss an image to introduce a desired visual effect. Applying a filter to an image can in some cases require a considerable amount of computing resources. However, because an image is static, mobile computing devices such as mobile phones are often capable of performing static image filtering.

Filters can also be applied to moving images. For instance, video footage can be sharpened, blurred, or embossed in the same way as a static image. However, filtering video footage typically requires substantial computing resources. Although a mobile computing device may be able to perform simple video filtering, applying complex filtering operations to live video streams is well beyond the computing capabilities of mobile computing devices.

Accordingly, it is desirable to develop improved mechanisms and processes relating to filtering video streams on mobile devices. Such improved mechanisms and processes can facilitate the application of filters to either live video streams or pre-recorded video streams. More specifically, improved mechanisms that allow users to apply sophisticated filters to live streams such as camera views are desirable.

OVERVIEW

Provided are various mechanisms and processes relating to performing live filtering of camera views and other media streams using client-server communication.

In one aspect, which may include at least a portion of the subject matter of any of the preceding and/or following examples and aspects, a process implemented at a client device and/or embodied in a computer readable media includes transmitting a first video frame in a raw video stream from the client device to a server via a network. Next, a filter processing message associated with the first video frame is received from the server. The filter processing message includes filter data for applying a filter to the first video frame. A filtered video stream is created via a processor at the client device by applying the filter to a second video frame, where the first video frame precedes the second video frame in the video stream. The filtered video stream is then presented. The process can continue iteratively to process successive video frames.

In another aspect, which may include at least a portion of the subject matter of any of the preceding and/or following examples and aspects, the filtered video stream may be presented live at the client device. The raw video stream may be a camera view associated with a camera operating at the client device. A processor at the client device may identify a first one or more image features in the first video frame via the processor at the client device and identifying a second one or more image features in the second video frame via the processor at the client device. In one example, creating the filtered video stream involves identifying a correspondence between the first one or more image features and the second one or more image features. In another example, a respective one or more image features may be identified in each of one or more intervening video frames, with each of the intervening video frames temporally located between the first video frame and the second video frame in the video stream, where creating the filtered video stream involves identifying a correspondence between the image features in each successive video frame from the first video frame through the intervening video frames to the second video frame.

In yet another aspect, which may include at least a portion of the subject matter of any of the preceding and/or following examples and aspects, the raw video stream is captured at the client device. The filtered video stream may be presented at the client device or at an augmented reality or virtual reality device in communication with the client device. The video stream may include spatial information such as depth information, visual flow between a plurality of viewpoints, or three-dimensional location information. The video stream may include scale information estimated using accelerometer information or inertial measurement unit (IMU) data.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

FIG. 11 illustrates an example of a device capturing views of an object of interest during a live filtering session.

DETAILED DESCRIPTION

Figure 1:
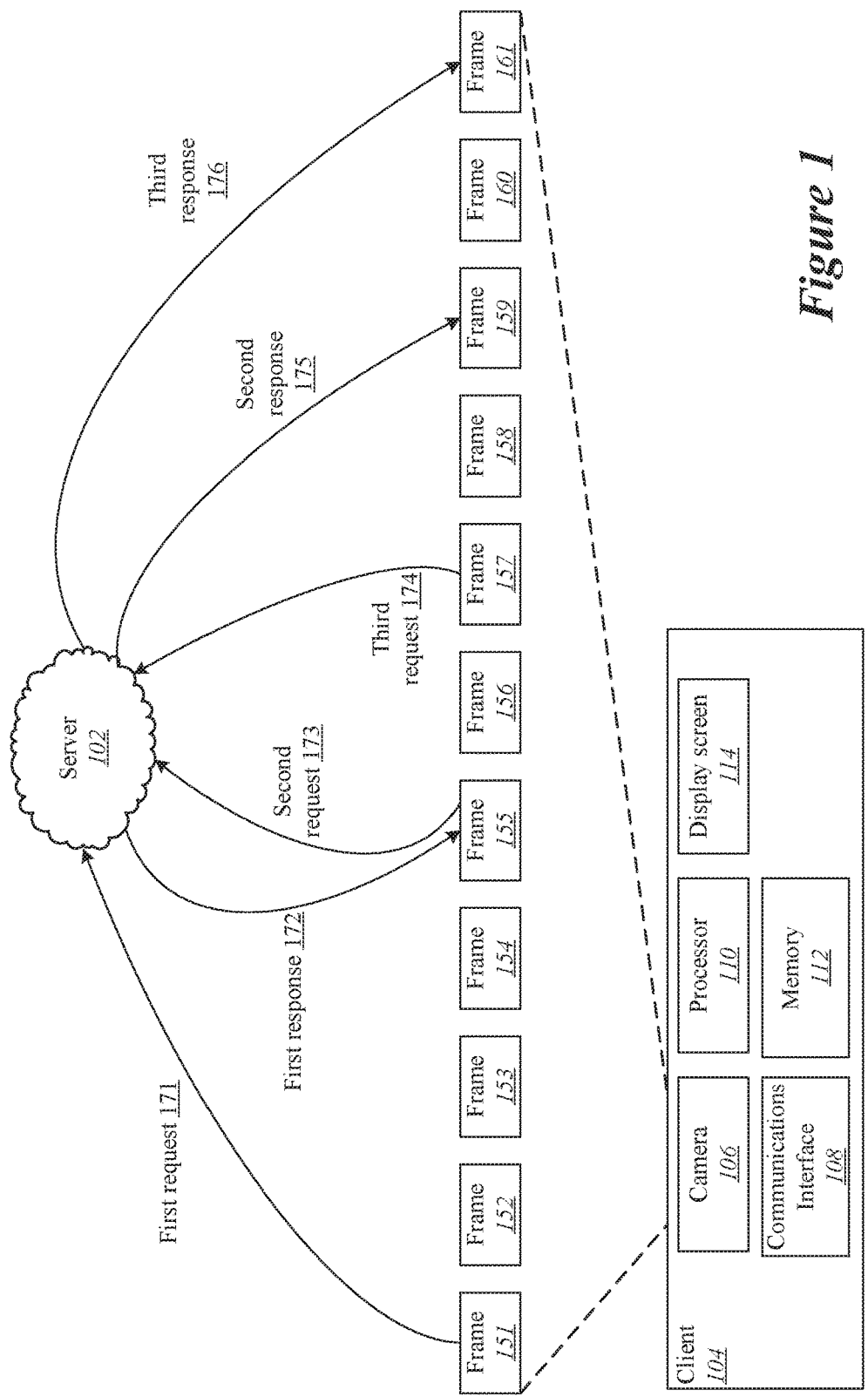
FIG. 1 illustrates one example of a system that can be used to perform a live video stream filtering.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to various embodiments, improved mechanisms and processes are described for facilitating video filtering. Such improved mechanisms and process allow a user at a client device to apply a video filter to a live video stream at the client device even if the application of the video filter is beyond the computing capabilities of the client device. For example, a filter may be applied to a live video stream such as a camera view captured at the client device.

According to various embodiments, video filtering is provided through a client-server communication system. During this process, a video frame is transmitted from the client device to the server. The server processes the video frame to produce filtering information and then transmits a filter processing message to the client device that indicates how to apply a filter to the video frame. The client device then applies the filtering information to create a filtered video stream. Filters modify and/or add to the visual data of a media object such as a live video stream or a multi-view interactive digital media representation. One example for a modification is a change to the color matrix, such as darkening the colors associated with a video stream. Examples of additions include, but are not limited to, adding 2D or 3D stickers or text that is placed relative to a reference coordinate system. For instance, a thought bubble may be placed near to a person's head and continue to stay with the person as the person moves. Given information about the content of the scene, scene elements can be used as reference coordinate system for filters, as masks to apply filters only to certain parts of the scene or to act as occluder for a filter, and for other such purposes. Although the computing capabilities of mobile devices increase over time, their computational power is still a limiting factor for advanced algorithms that allow to obtain detailed information about the content of a scene. In some implementations, the server may respond to the client device with information that the client device can use to apply a filter to a frame. Alternately, or additionally, the server may add a filter to a frame and then provide the filtered frame to the client device.

According to various embodiments, a combination of client and server applications may be used to obtain information about a scene. While a user points the camera onto a scene, visual data as well as potentially other information (such as inertial measurement unit (IMU) data, global position system (GPS) location, etc.) are sent from the client application to a server application. The server application uses the data to obtain information about the scene. This information is then sent from the server back to the client where it is used to guide live filtering. While the user keeps pointing the camera at the scene, more data can be sent which can be used by the server to improve the obtained information about the already observed scene and to also obtain information about scene parts which were not captured previously. This updated information is then sent back to the client application.

According to various embodiments because the communication between the client device and the server coupled with the processing time at the server involves more latency than the time between successive video frames, the video stream at the client machine has progressed to a different frame by the time the filter processing message has been received. In one example, potentially many intervening video frames are presented between when the video frame is transmitted from the client device to the server and when the filter processing message is received at the client device from the server. Thus, the client device performs client-side processing of each video frame in order to apply the filter in addition to relying upon information provided by the server. In some implementations, the client device and the server may be implemented on different physical machines that communicate via a network. Alternately, the client device and the server may be implemented as different processes on the same physical machine.

The mechanisms and processes described in this disclosure provide improvements over previous filtering approaches. For example, conventional video filtering approaches at a client device are limited by the computing power of the client device, which is typically much more restricted than the computing power of a server. Thus, techniques and mechanisms described herein expand the capabilities of the client device by allowing the client device to provide sophisticated filtering to live video streams.

With reference to FIG. 1, shown is one example of a system that can be used to perform a live video stream filtering. As depicted, a combination of client and server applications is used to implement a filtering mechanism that runs live in a capture device application, such as with a camera on a smartphone. While the camera is recording, the user points the camera at an object. The smartphone then communicates with the server, and collectively the two devices analyze the video stream to provide a filtered view of the video stream in real time.

In the present embodiment, the client is depicted as device 104, which can be a capture device such as a digital camera, smartphone, mobile device, etc. The server is depicted as system 102, which receives images selected from the video stream at the client device. The video stream at the client device is divided into video frames 151 through 161. The server processes the frames sent from the client device and response with filtering information that can be used to apply a filter to the video stream at the client device. The client device includes a camera 106 for capturing a video stream, a communications interface 108 capable of communicating with the server, a processor 110, memory 112, and a display screen 114 on which the video stream may be presented.

According to various embodiments, the client and server may coordinate to apply a filter to the video stream at least in part due to limited computing resources at the client machine. However, as discussed herein, the network latency and processing time involved in transmitting video frames to the server means that the video stream at the client device has progressed to a new video frame before receiving the filter processing message from the server with the filter information associated with the preceding frame. For instance, in FIG. 1, the first request 171 transmits the frame 151 to the server, while the first response 172 corresponding to the frame 151 arrives while the frame 155 is being processed. Similarly, the second request 173 and third request 174 transmit frames 155 and 157 respectively, but the corresponding second and third responses 175 and 176 are not received until the video stream has arrived at frames 159 and 161 respectively.

In some implementations, the client application sends (and also receives) data in a sparse manner, meaning that data is sent to the server potentially not for all frames captured by the camera. Therefore, in order to present a filtered result for a live stream, the information received from the server is tracked or propagated to new frames received from the camera until new information from the server is available. For example, in FIG. 1, the client device may propagate information received in the first response 172 through frames 156, 157, and 158 until the second response 175 is received for the processing of frame 159.

Figure 2:
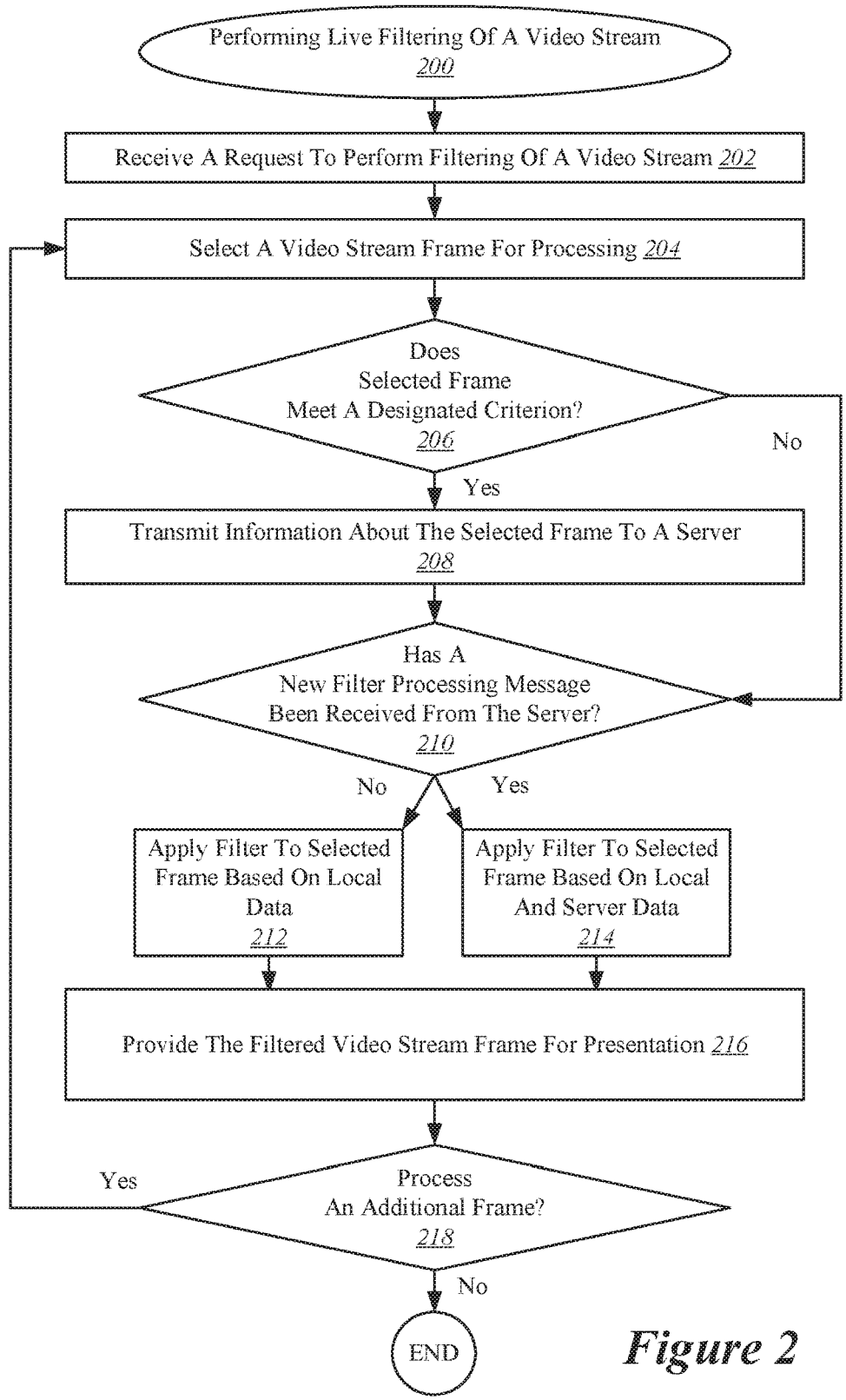
FIG. 2 illustrates one example of a process for performing live filtering of a video stream.

With reference to FIG. 2, shown is one example of a process for performing live filtering of a video stream. According to various embodiments, the process shown in FIG. 2 may be performed at a client machine in communication with a server, such as the client machine 104 in communication with the server 102 shown in FIG. 1. The two devices may coordinate to split the processing operations required to apply a filter to a live video stream.

In the present example, a live filtering process 200 begins with the client device receiving a request to perform filtering of a video stream at 202. In some implementations, the request may be generated based on user input requesting the application of a filter. Alternately, the request may be generated automatically when the client device detects that a video stream is being captured or displayed at the client device. Next, the system select a video stream frame for processing at 204. According to various embodiments, video stream frames may be processed sequentially. For instance, each frame in a live video stream may be processed prior to presenting the video stream to the user so that a filter may be applied.

At 206, a determination is made as to whether the selected video stream frame meets a designated criterion. In some implementations, any of a variety of criteria may be used to select a video stream frame for transmission to the server. For example, if the filtering process has just been initiated, then the client device may select the first available video stream frame for processing. As another example, one or more criteria may be applied to select the video stream frame. For instance, the client device may select a video stream frame that exceeds a threshold level of light or detail to allow for sufficient information for applying a filter. As yet another example, the client device may select a video stream frame for processing after a designated period of time or number of frames have passed since the last video stream frame was transmitted to the server.

If the selected frame meets the designated criterion, then information about the selected frame is transmitted to the server at 208. According to various embodiments, a variety of information may be transmitted to the server. In one example, some or all of the image data associated with the frame may be transmitted. For instance, the entire frame may be transmitted. Alternately, the frame may be compressed or down sampled to reduce bandwidth usage. In a second example, IMU information such as gyroscopic data, compass data, or accelerometer data may be transmitted. This IMU information may provide data about the position, velocity, acceleration, direction, rotation, or other such characteristics of the device around the time that the frame was captured. In a third example, GPS information may be transmitted. In some implementations, the specific information transmitted to the server may depend on the type of processing being performed at the server and/or the type of filter being applied at the client device.

Next, a determination is made at 210 as to whether a new filter processing message has been received from the server. As shown in FIG. 1, the server sends messages that include information for applying filters to frames, but these filter processing messages are sent at a lag when compared with the live processing and presentation of the video stream.

If no new filter processing message has been received, then at 212 a filter is applied based on existing data that is locally available at the client machine. In some embodiments, applying a filter based on locally available data may involve propagating information from one frame to another. For instance, a current frame may be analyzed to identify the same feature (e.g., an object corner or an area of color) that was identified in the preceding frame. According to various embodiments, a multitude of approaches can be used propagate information from one frame to another. One such approach is frame-to-frame tracking, which can be based on information that may include, but is not limited to: tracking of sparse keypoints, dense or sparse optical flow, patch tracking, tracking of geometric instances, or other such information. Another such approach is frame-to-frame matching, which involve techniques that may include, but are not limited to: descriptor based matching of keypoints which are detected in both frames, patch matching, detection and matching of higher level features (e.g. a human face), or other such techniques. Both approaches can focus the tracking and matching efforts on regions or features of interest if such regions or features are identified.

Figure 4:
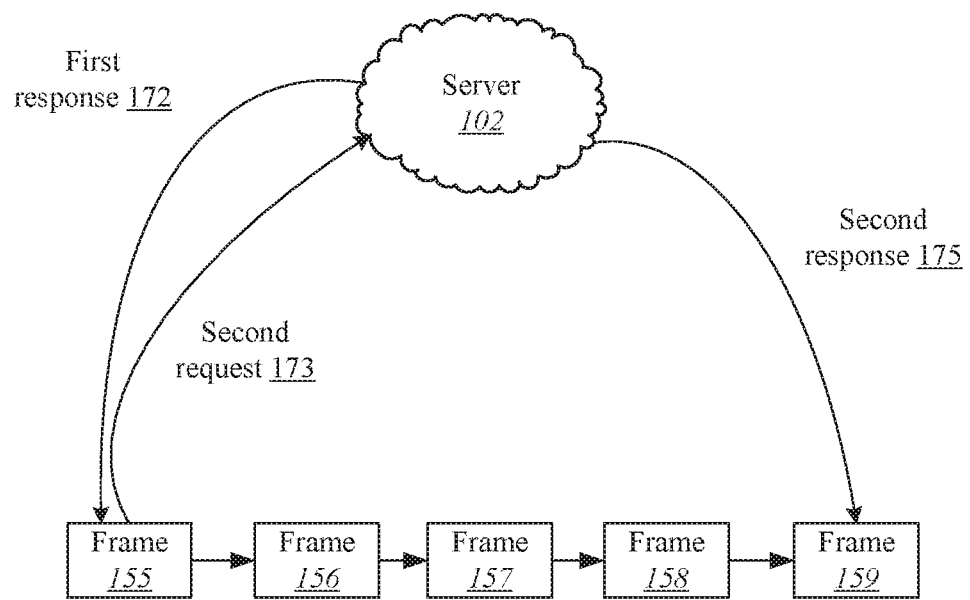
FIG. 4 illustrates one example of a configuration for propagating information across successive frames in a video stream during live filtering.
Figure 6:
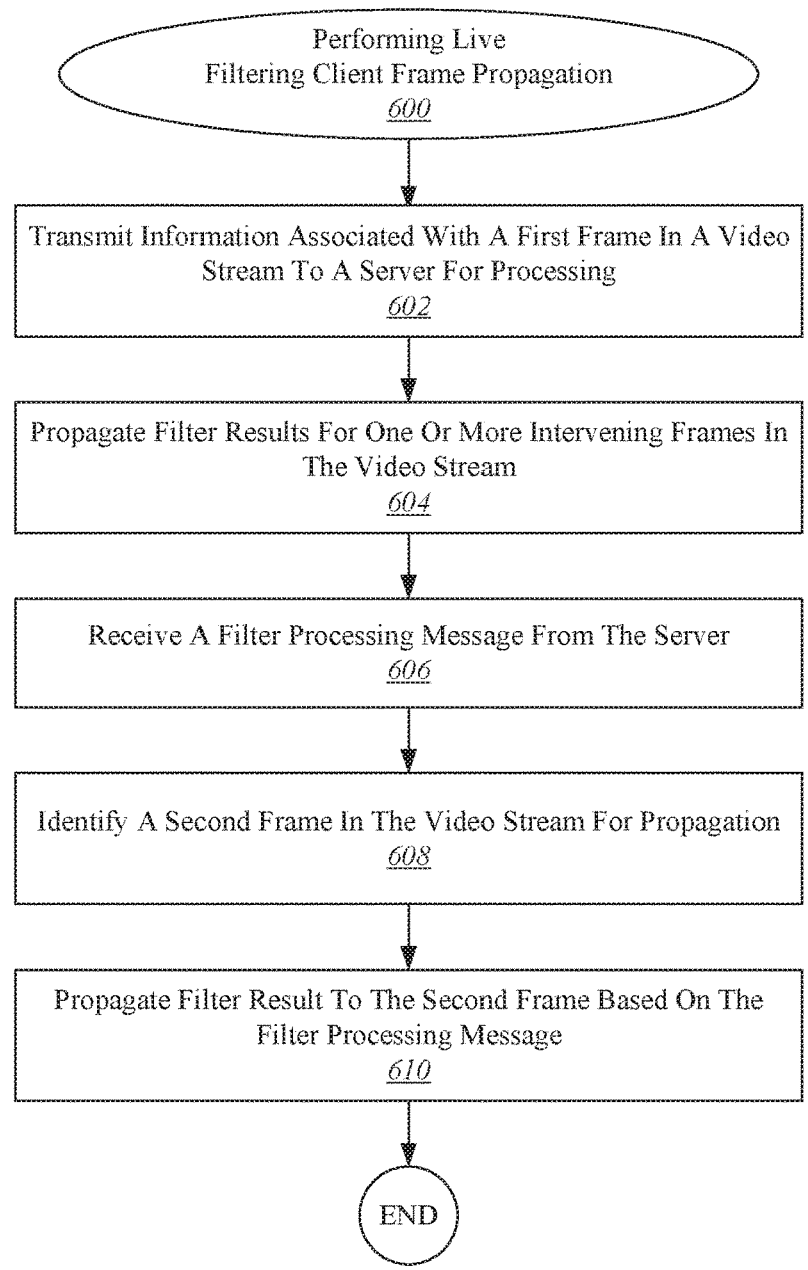
FIG. 6 illustrates one example of a procedure for propagating information across successive frames in a video stream during live filtering.

In some implementations, a special processing cases the time from the first frame that is sent to the server to the frame when the corresponding results are received back from the server. Since there is no server-created scene interpretation available until the results of the first frame are received, the client device may not know which specific information in the scene needs to be propagated. Various approaches are possible for handling this situation. In one example, all or most information in the frame is equally propagated. For instance, keypoints may be distributed over the whole image. In a second example, an efficient method for estimating one or more regions of interest may be applied on the client device. For instance, a bounding box for the region may be computed. Then, the propagation of information may be concentrated on the region or regions of interest. An example embodiment that may be used in conjunction with either the first or second approaches is illustrated in FIG. 6. In a third example, matching methods may be applied to directly match the information extracted from the first frame to the frame after which the results from the server are available. An example embodiment reflecting this third approach is illustrated in FIG. 4.

If instead a new filter processing message has been received, then at 214 a filter is applied based on both the locally available data and the data provided by the server. According to various embodiments, new information received from the server may be combined with the information propagated from frame to frame. To accomplish this goal, various approaches may be used. In one example, old information may be replaced with new information received from the server. In a second example, old information may continue to be used without alteration, for instance if the new information is close enough to the old information. In a third example, old information may be combined with new information in a weighted fashion, for instance based on relative confidence values associated with server results and propagation results.

According to various embodiments, the specific operations performed to apply a filter may depend in large part upon the specific type of filter being applied. In one example, a caption bubble may be applied to a video of a person when the person exhibits a particular pose. In this first example, the server may perform skeleton detection to facilitate pose estimation while the client device tracks low-level image features such as a point associated with a person's elbow or a surface area that is part of the background. Then, the client device may combine the low-level feature tracking information with the skeleton detection information provided by the server to determine whether the person is positioned in the particular pose. In a second example, a filter may be applied to a vehicle based on its position (e.g., crossing a finish line). In this second example, the server may perform segmentation to identify the segmentation and characteristics of the vehicle, while the client device tracks low-level features such as shapes to propagate the location of the vehicle between communication with the server. Other examples of filters that may be applied include, but are not limited to: adding fire on the street behind vehicle tires, adding smoke behind a vehicle, adding light trails to a car to indicate fast motion, adding motion blur to the background, replacing a person's body with that of a superhero, replacing specific parts of a person (e.g., replacing a head or limbs with those of another person), and modifying specific parts of a person (e.g., enlarging or reducing the size of a person's head or limbs).

After applying the filter to the selected frame, the filtered frame is provided for presentation at 216. In some implementations, providing the filtered frame for presentation may involve displaying the filtered frame as part of the video stream on a display screen. Alternately, or additionally, the filtered frame may be stored to memory and or persistent storage for later playback. In a different example, the filtered frame may be transmitted to a separate device for presentation, such as an augmented reality or virtual reality device in communication with the client device. Finally, at 218 a determination is made as to whether to process an additional frame. According to various embodiments, additional frames may be processed until any of a variety of conditions are met. These conditions may include, but are not limited to: receiving user input indicating a request to terminate live filtering, determining that the video stream has terminated, or determining that the server is inaccessible via the network.

Figure 3:
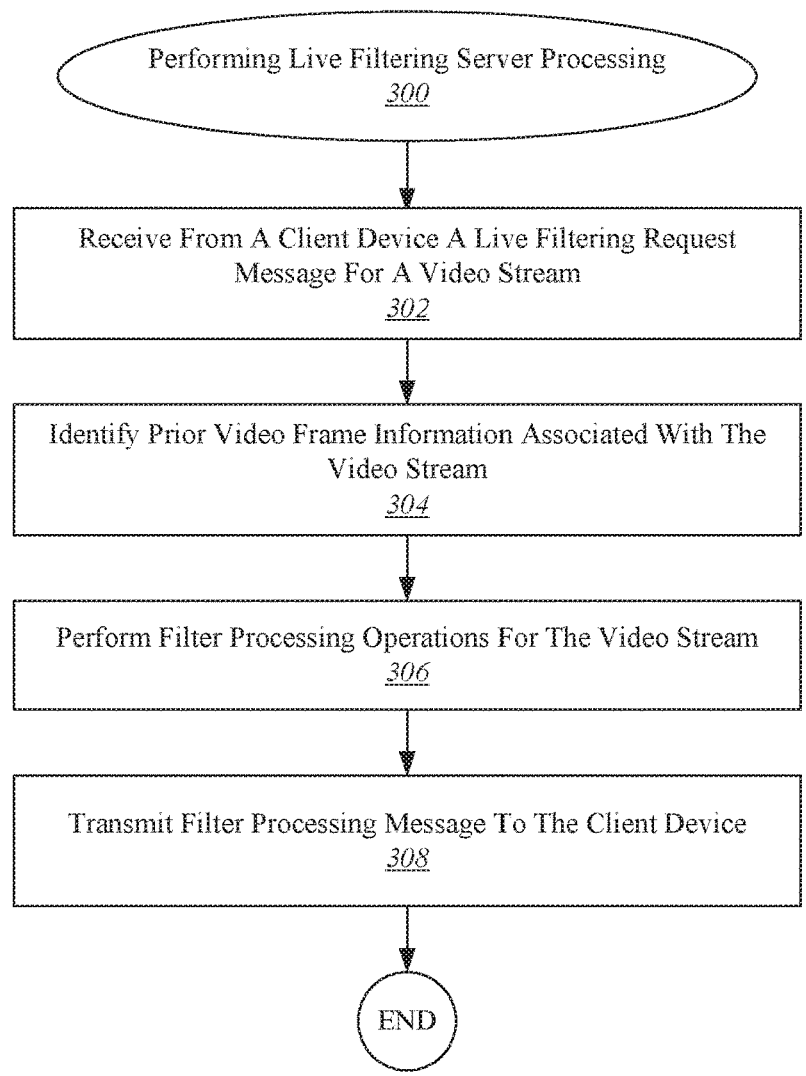
FIG. 3 illustrates one example of a process for performing live filter processing of a video stream at a server.

With reference to FIG. 3, shown is one example of a configuration for performing live filtering server processing. In some implementations, the procedure 300 may be performed in order to perform server-side processing to facilitate the live filtering of a media stream at a client device. The procedure 300 may be initiated at 302 when a live filtering request message for a video stream is received from a client device. According to various embodiments, as discussed with respect to FIGS. 1 and 2, a variety of information may be included in a live filtering request message. For instance, the request message may include the identity of the client device as well as any information necessary for performing live filtering, such as image data information associated with one or more video stream frames, IMU information, or GPS information.

In particular embodiments, after receiving the request message, at 304 the server may identify information associated with one or more prior video frames in the video stream. For example, the prior video frame information may include any raw data transmitted from the client device in early live filtering request messages. Alternately, or additionally, the prior video frame information may include processed or filtered data generated by processing previous live filtering request messages.

Then, at 306 the server performs filter processing operations for the video stream. The specific filter processing operations performed may depend in large part on the particular type of filter being applied to the video stream. Some examples of processing operations running on the server may include, but are not limited to: detection, segmentation, and pose estimation. Such methods may be applied to objects that include, but are not limited to: humans, animals, vehicles, inanimate objects, and plants. Other examples of methods running on the server may include, but are not limited to: depth estimation, scene reconstruction, scene decomposition, and semantic labeling.

Finally, at 308, the filter processing information is transmitted to the client device. According to various embodiments, the filter processing operations may generate a wide range of information for transmission. For example, the filter processing operations may generate location information that identifies locations of high-level features such as faces or skeleton components on image data sent from the client device. As another example, the filter processing operations may include or identify virtual elements to overlay on top of the video stream at the client device. For instance, the filter processing operation may identify the video stream as including footage of a running dog and then indicate as one filter possibility a cape that could be overlain on the moving image of the dog to generate a visual effect of a "super dog." As yet another example, the filter processing operations may include semantic elements such as labels for recognized objects or words generated by applying optical character recognition to text in the video stream. Thus, the specific information transmitted to the client device at operation 308 may depend in part upon the characteristics of the filter processing operations performed at the server.

Figure 5:
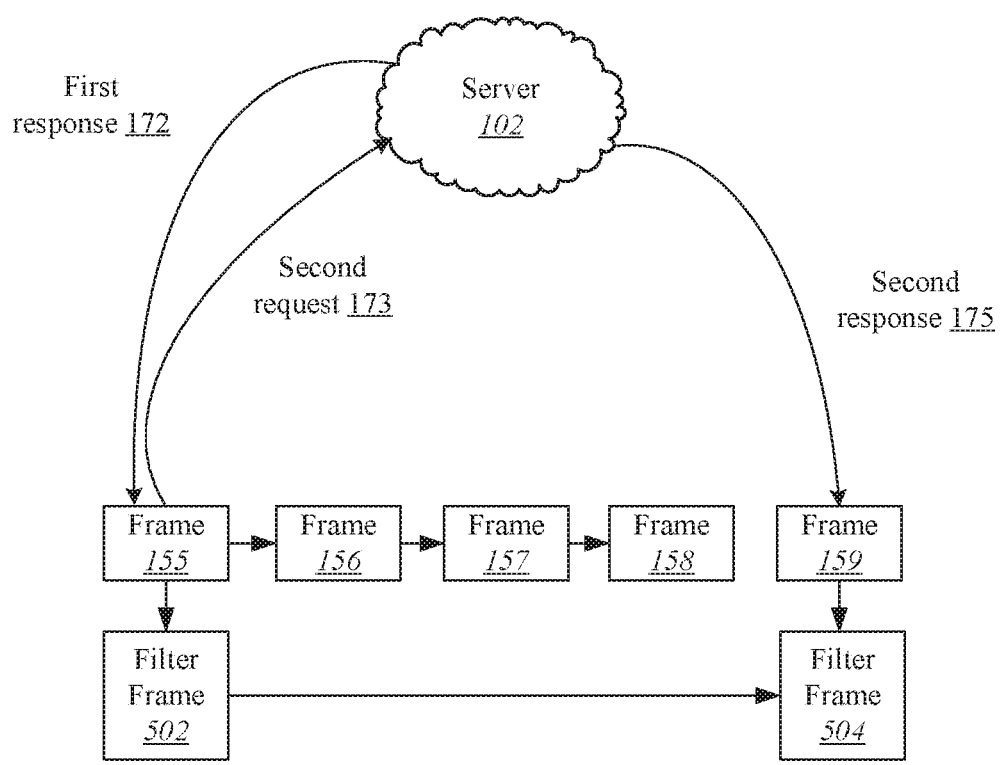
FIG. 5 illustrates another example of a configuration for propagating information across successive frames in a video stream during live filtering.

With reference to FIG. 4, shown is one example of a configuration for propagating information across successive frames in a video stream during live filtering. With reference to FIG. 5, shown is another example of a configuration for propagating information across successive frames in a video stream during live filtering. In the examples shown in FIG. 4 and FIG. 5, a second request 173 is sent from the client to the server and includes information up to the frame 155. However, the second response 175 that includes information generated by processing the first response is not received by the client until later, when the video stream has moved on to the frame 159. In this example, the client device has up-to-date information from the server via the first response 172 for applying a filter to frame 155. However, the client device may need to present frames 156, 157, and 158 without receiving further information from the server, which may involve propagating information associated with the frame 155 successively through frames 156, 157, and 158. FIG. 6 discusses a procedure that includes such propagation.

In addition, the client device may need to reconcile the information received in the second response 175 with the intervening frames 156, 157, and 158, as well as the new frame 159. In some implementations, as shown in FIG. 4, the client device may propagate to the new frame 159 directly from the preceding frame 158. However, when propagating to the new frame 159, the client machine has the benefit of having received updated filter processing information from the server. For instance, the server may redefine the shape of the area or the constellation of points associated with a person's face because the person has rotated his or her face away from the camera. This additional information may allow for improved propagation, both for frame 159 and for successive frames, by providing an improved reference point.

In other implementations, as shown in FIG. 5, the client device may ignore the propagation of features in the intervening frames 156, 157, and 158 when processing the filter information provided in the second response 175. In this example, the client device may create a filter frame 502 directly from the first response 172 and the frame 155. Then, to account for the new frames that have occurred between sending the second request 173 and receiving the second response 175, the client device may propagate changes forward directly from the processed frame 502. Propagating from the filter frame 402 has the advantage that the second request 173 and therefore the second response 175 is based on the frame 155. Therefore, although the filter frame 502 is less current than the preceding frame 158, creating the filter frame 504 by propagating the filter frame 502 to the frame 159 as guided by the filter information included in the second response 175 may be more accurate than propagating from the frame 158.

With reference to FIG. 6, shown is an example of a procedure for propagating information across successive frames in a video stream during live filtering. In the procedure 600, information associated with a first frame in a video stream is transmitted to a server for processing at 602. For instance, the second request message 173 shown in FIG. 6 may be sent from the client device to the server. Then, at 604, filter results are propagated for one or more intervening frames in the video stream, such as the frames 156, 157, and 158. According to various embodiments, information can be directly propagated to or between any other frames, for instance any frames between 153 and 159.

As discussed herein, propagation may involve any of a variety of techniques, depending on the particular implementation. One such approach is frame-to-frame tracking, which can be based on information that may include, but is not limited to: racking of sparse keypoints, dense or sparse optical flow, patch tracking, tracking of geometric instances, or other such information. Another such approach is frame-to-frame matching, which involve techniques that may include, but are not limited to: descriptor based matching of keypoints which are detected in both frames, patch matching, detection and matching of higher level features (e.g. a human face), or other such techniques. Both approaches can focus the tracking and matching efforts on regions or features of interest if such regions or features are identified.

For example, the client device may be configured to identify features associated with the frames such as points or areas. A point may correspond, for instance, with an elbow, a table corner, a nose, or some other such physical object. An area may correspond, for instance, with a shirt, a table surface, a face, or some other such physical area of interest. The client device may be configured to identify such features in each frame. Then, the client device may construct a correspondence between successive frames. For instance, one or more points or areas may be located at similar locations across successive frames. Further, motion across successive frames may be tracked by detecting trajectories of points or areas across successive frames.

In some implementations, high-level features identified by the server may be tracked by tracking lower-level features capable of being identified by the client device. For example, the server may indicate that a particular constellation of points or an area of color represents a face, and that a speech bubble is to be located next to the face. Then, the client device may track the constellation of points or area of color over successive frames and move the speech bubble as necessary to hold its position relative to the face.

After propagating the filter results for one or more intervening frames, at 606 a filter processing message is received from the server. For instance, in the example shown in FIG. 6 the second response message 175 is received. Then, at 608, a second frame in the video stream is identified for propagation. According to various embodiments, the second frame may be the next suitable frame available for processing after the receipt of the filter processing message. Finally, at 610, filter results are propagated to the second frame based on the filter processing message.

In some implementations, as discussed with respect to FIG. 4, the filter results may be propagated from the preceding frame to the second frame in much the same way as discussed with respect to operation 604. In other implementations, as discussed with respect to FIG. 5, the filter results may be propagated directly from an earlier frame, such as the frame associated with the request message that gave rise to the filter processing message received at 606. Of course, the example configuration and procedures shown herein depict only a limited number of frames. In order to show a continuous filtered live video stream, the procedures may be repeated as needed until live filtering is terminated.

Figure 7:
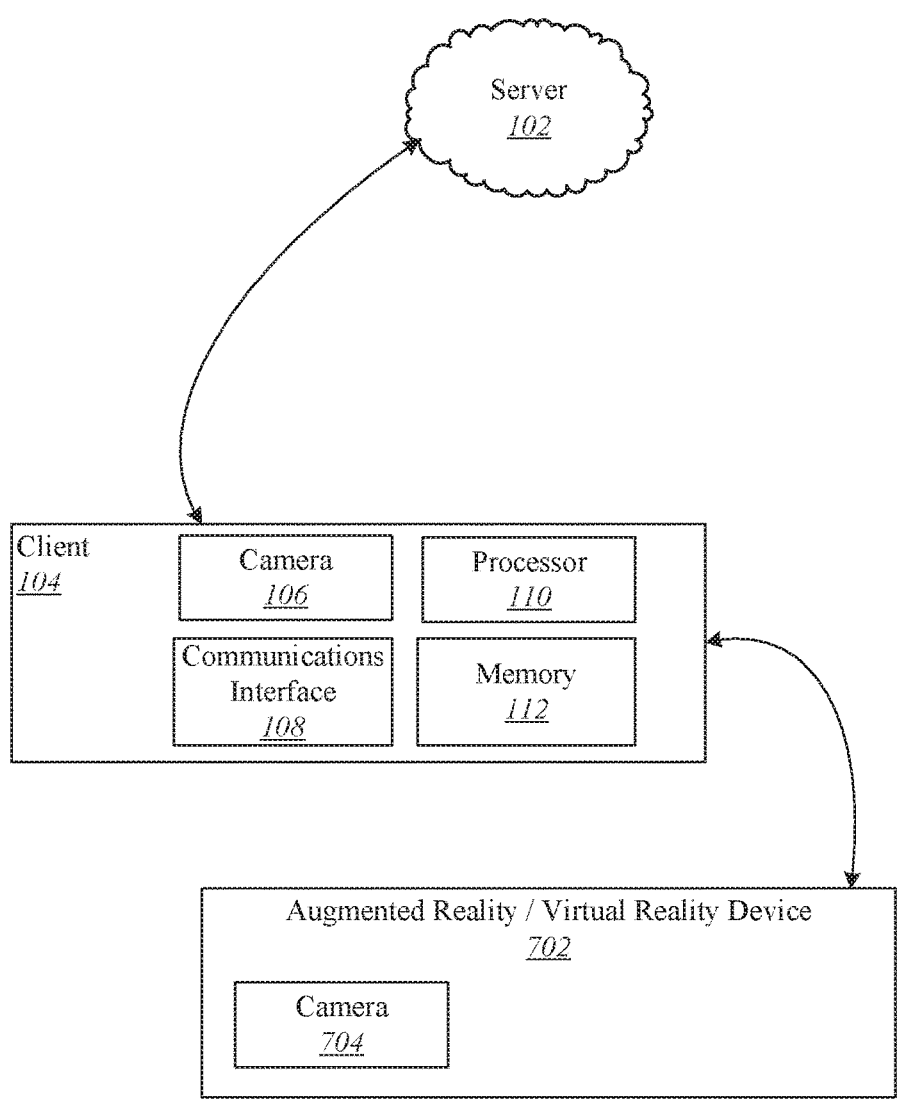
FIG. 7 illustrates one example of a configuration for performing live filtering of a media stream presented on an augmented reality or virtual reality device.

With reference to FIG. 7, shown is one example of a configuration for performing live filtering of a media stream presented on an augmented reality or virtual reality device. In virtual reality, the computer-generated simulation of a three-dimensional image or environment can be interacted with in a seemingly real or physical way by a person using special electronic equipment, such as a helmet with a screen inside or gloves fitted with sensors. Augmented reality (AR) is a live direct or indirect view of a physical, real-world environment whose elements are augmented (or supplemented) by computer-generated sensory input such as sound, video, graphics or GPS data.

According to various embodiments, the media presentation may involve an augmented reality or virtual reality media device such as the media device 702 shown in FIG. 7. In some examples (e.g., augmented reality), the media device 702 may be equipped with a camera 704. The media device 702 may communicate with the client device 104 to present the media experience. For instance, the client device 104, the media device 702, or both may collect user input and/or environmental input data. The client device 104 may also perform processing and/or network communications operations to facilitate the operation of the media device 702.

In some implementations, a video stream may be collected by the client device 102 or the media device 702.

Then, as discussed herein, information related to the video stream (e.g., video frame image data, IMU data, etc.) may be transmitted to the server 102. The server may then response with one or more messages that include information that may be used to apply a filter to the collected video stream. Then, the client device may combine the received information with locally propagated information to produce the filtered media stream. The filtered media stream may then be presented at the media device 702.

Figure 8:
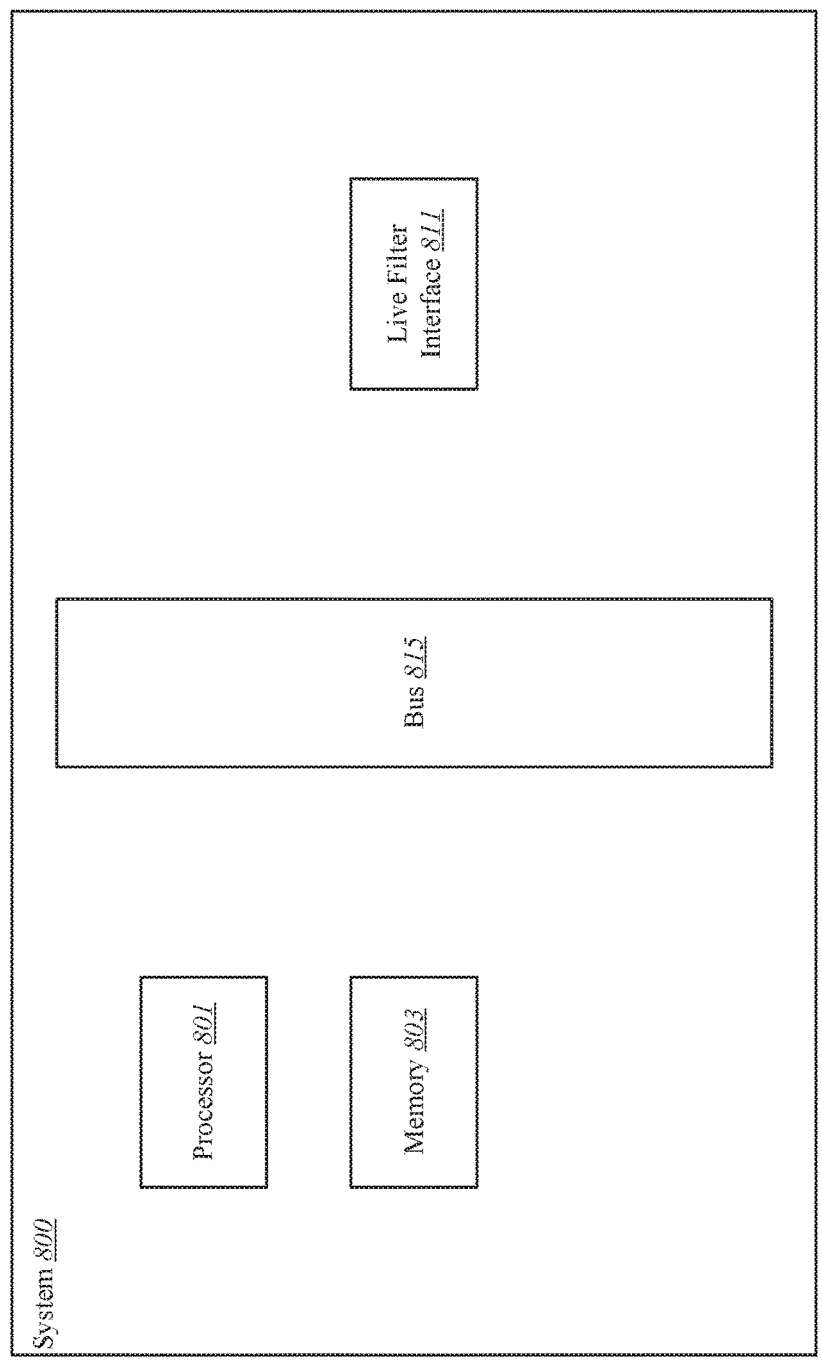
FIG. 8 illustrates a particular example of a computer system that can be used with various embodiments of the present invention.

With reference to FIG. 8, shown is a particular example of a computer system that can be used to implement particular examples of the present invention. For instance, the computer system 800 can be used to perform live filtering using client-server communications according to various embodiments described above. According to particular example embodiments, a system 800 suitable for implementing particular embodiments of the present invention includes a processor 801, a memory 803, live filter interface 810, and a bus 815 (e.g., a PCI bus). The live filtering interface 810 may include separate input and output interfaces, or may be a unified interface supporting both operations. When acting under the control of appropriate software or firmware, the processor 801 is responsible for such tasks such as optimization. Various specially configured devices can also be used in place of a processor 801 or in addition to processor 801. The complete implementation can also be done in custom hardware. The live filter interface 810 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 9:
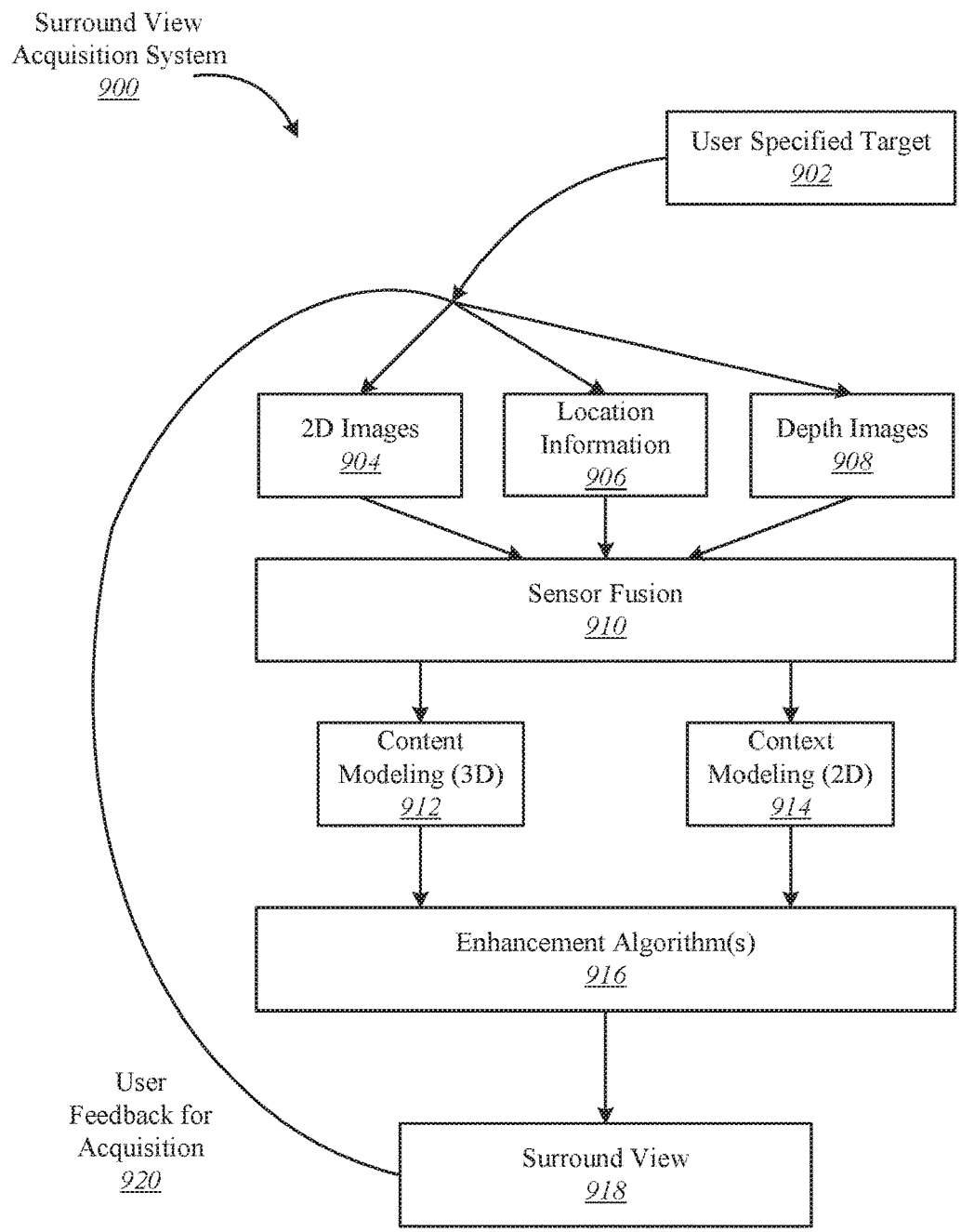
FIG. 9 illustrates an example of a surround view acquisition system.

With reference to FIG. 9, shown is an example of a surround view acquisition system that can be used to generate a multi-view interactive digital media representation that can be used for live filtering. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 900 is depicted in a flow sequence that can be used to generate a surround view. According to various embodiments, the data used to generate a surround view can come from a variety of sources. In particular, data such as, but not limited to two-dimensional (2D) images 904 can be used to generate a surround view. These 2D images can include color image data streams such as multiple image sequences, video data, etc., or multiple images in any of various formats for images, depending on the application. Another source of data that can be used to generate a surround view includes location information 906. This location information 906 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 908. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 910. In some embodiments, a surround view can be generated a combination of data that includes both 2D images 904 and location information 906, without any depth images 908 provided. In other embodiments, depth images 908 and location information 906 can be used together at sensor fusion block 910. Various combinations of image data can be used with location information at 906, depending on the application and available data.

In the present example embodiment, the data that has been fused together at sensor fusion block 910 is then used for content modeling 911 and context modeling 914. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat"

image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 911 and context modeling 914 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 902 can be chosen. It should be noted, however, that a surround view can be generated without a user specified target in some applications.

In the present example embodiment, one or more enhancement algorithms can be applied at enhancement algorithm(s) block 916. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure- detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 916. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 918 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in live filtering.

According to various example embodiments, once a surround view 918 is generated, user feedback for acquisition 920 of additional image data can be provided. In particular, if a surround view is determined to need additional views to provide a more accurate model of the content or context, a user may be prompted to provide additional views. Once these additional views are received by the surround view acquisition system 900, these additional views can be processed by the system 900 and incorporated into the surround view.

Figure 10:
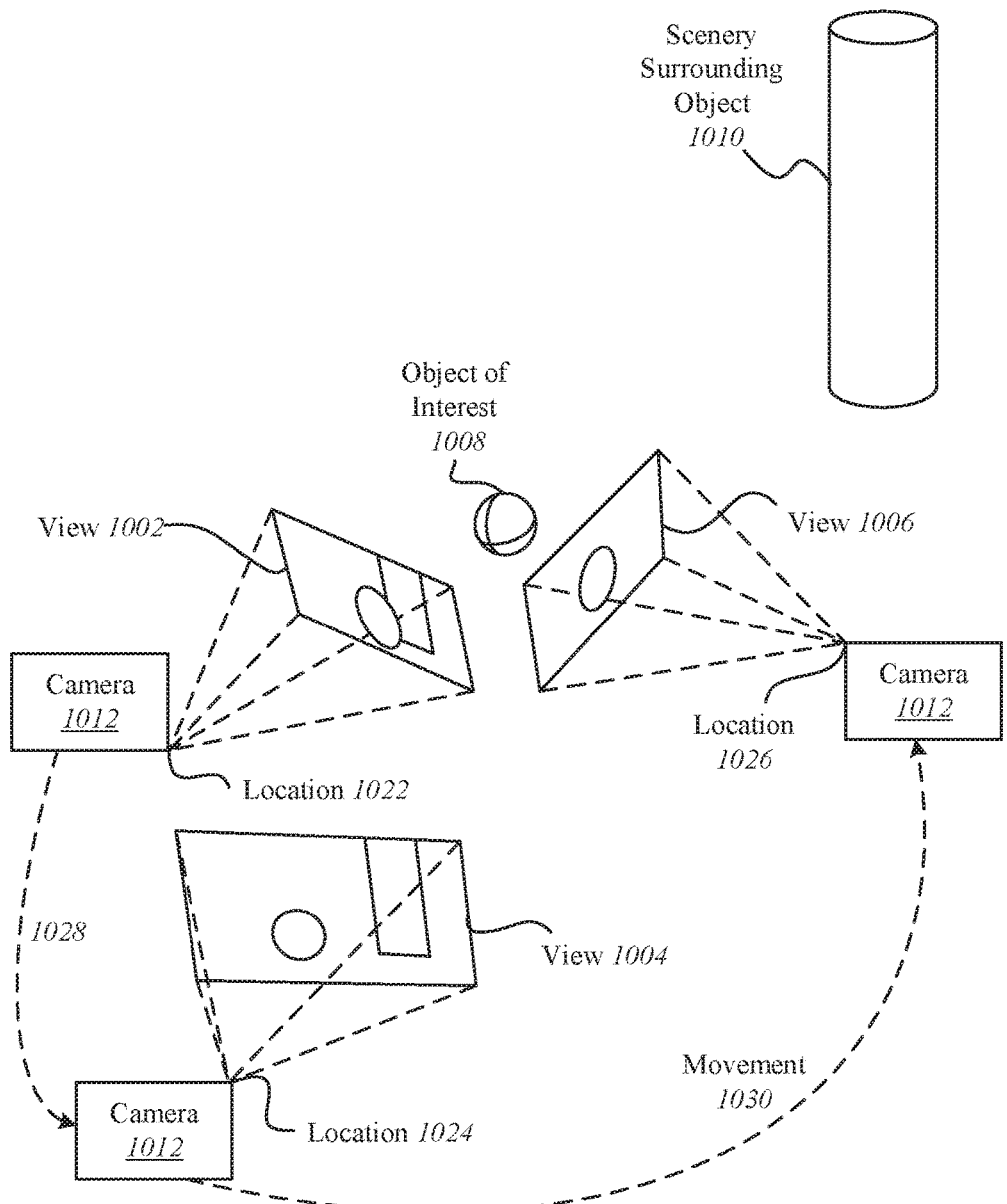
FIG. 10 illustrates an example of a device capturing multiple views of an object of interest from different locations during a live filtering session.

With reference to FIG. 10, shown is an example of a device capturing multiple views of an object of interest from different locations during a live filter session. The capture device is indicated as camera 1012, and moves from location 1022 to location 1024 and from location 1024 to location 1026. The multiple camera views 1002, 1004, and 1006 captured by camera 1012 can be fused together into a three-dimensional (3D) model. According to various embodiments, multiple images can be captured from various viewpoints and fused together to provide a multi-view digital media representation.

In the present example embodiment, camera 1012 moves to locations 1022, 1024, and 1026, respectively, along paths 1028 and 1030, in proximity to an object of interest 1008. Scenery can surround the object of interest 1008 such as object 1010. Views 1002, 1004, and 1006 are captured by camera 1012 from locations 1022, 1024, and 1026 and include overlapping subject matter. Specifically, each view 1002, 1004, and 1006 includes the object of interest 1008 and varying degrees of visibility of the scenery surrounding the object 1010. For instance, view 1002 includes a view of the object of interest 1008 in front of the cylinder that is part of the scenery surrounding the object 1008. View 1004 shows the object of interest 1008 to one side of the cylinder, and view 1006 shows the object of interest without any view of the cylinder.

In the present example embodiment, the various views 1002, 1004, and 1006 along with their associated locations 1022, 1024, and 1026, respectively, provide a rich source of information about object of interest 1008 and the surrounding context that can be used to produce a multi-view digital media representation, such as a surround view. For instance, when analyzed together, the various views 1002, 1004, and 1006 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 1008 into content and the scenery 1010 as the context. In particular examples, the content can then be used for applying filters.

With reference to FIG. 11, shown is an example of a device capturing views of an object of interest during a live filter session. During the live filter session, multiple views of the object 1008 may be captured by the device 1011 from different locations. In the present example, data is acquired when a user taps a record button 1102 on capture device 1011 to begin recording images of the object.

The user moves 1100 the capture device 1011 from location 1022 to location 1024 along path 1028 and from location 1024 to location 1026 along path 1030. As described in more detail throughout this application, filtering can be provided in real-time at the device 1011, and prompts for the user to capture particular views can be provided during the session. In particular, the system can prompt the user to move the device 1011 in a particular direction or may prompt the user to provide additional information. As the user records different views of the object, live filtering may be reiteratively refined to provide increasingly accurate results. The user may choose to stop recording by tapping the record button 1102 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a live filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a video.

According to various embodiments, a potentially infinite variety of filters or modifications may be applied to digital media content. Although various examples have been described elsewhere in this application, some additional examples are provided here to provide additional context. When a person is detected with arms outstretched, visual elements such as angel wings, bat wings, butterfly wings, plane wings and engines, or a jetpack with exhaust fumes may be added. When a person is detected in a leaning posture, visual elements such as a dinosaur tail, a squirrel tail, or a racoon tail may be added. When a person is detecting standing with hands on hips, visual elements may be added to replace the person's clothing with a superhero costume or to add a cape to the person's existing attire. When a person is detected as yelling, for instance with hands cupped around the mouth, visual elements may be added to depict a megaphone, flames, or a speech bubble near the person's mouth. Depending on a person's pose, visual elements may be added to replace a person's clothing or depict a person's body as a skeleton. When a person is detected as standing in a body builder's pose, the person's body may be replaced with one exhibiting more muscles or deformed to appear to exhibit more muscles. When a person is detected as having a hand over a mouth, visual elements may be added to make the person appear to be underwater as a scuba diver or mermaid. When a person is detect as leaning forward in a flying position, visual elements may be added to make the person appear to be a flying angel or super hero. For instance, a person's legs may be moved to make the person appear to be not supported by the ground. When a person is detected with arms uplifted, visual elements may be added to cause rainbows, money, or angels to appear over the person. When a person is detected with hands arranged in a boxing pose, visual elements may be added to make the person appear to be wearing boxing gloves or holding a weapon. A person's facial features or body may be modified to make the person appear to have the head or body of an animal, a fruit, a robot, or some other such object. A person's facial features may be detected and then used to select a corresponding emoticon, which then may be used to replace the person's head. When a person is detected as walking a dog, the dog's head and the person's head may be swapped. A person may be made to appear much thinner, heavier, more muscular, less muscular, or wavier than in reality. Motion blur may be added to make a person appear to be spinning very quickly. The preceding examples provide additional context about the types of visual modifications that could be made, but a potentially infinite variety of visual modifications may be provided according to various embodiments.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

What is claimed is:

1. A method comprising:

automatically transmitting, using an electronic client device, a first video frame in a raw video stream from the electronic client device to a server via a communication network in response to determining the first video frame meets a designated criterion, the raw video stream being captured live by the electronic client device;

receiving, by the electronic client device, from the server a filter processing message associated with the first video frame, the filter processing message including filter data for applying a filter to the first video frame;

creating a filtered video stream in real time via a processor at the electronic client device by applying the filter to a second video frame, wherein the first video frame precedes the second video frame in the raw video stream, wherein the filter is applied to the second video frame by propagating information from the first video frame to the second video frame based on the filter data, wherein the second video frame is neither transmitted to nor received from the server; and presenting the filtered video stream live at the electronic client device;

wherein applying the filter to the second video frame comprises:

identifying a first one or more image features in the first video frame via the processor at the electronic client device;

propagating the first one or more image features to the second video frame;

identifying a second one or more image features in the second video frame via the processor at the electronic client device; and identifying a correspondence between the first one or more image features and the second one or more image features.

2. The method recited in claim 1, wherein the raw video stream is a camera view associated with a camera operating at the electronic client device.

3. The method recited in claim 1, the method further comprising:

identifying a respective one or more image features in each of one or more intervening video frames, each of the intervening video frames temporally located between the first video frame and the second video frame in the video stream, wherein creating the filtered video stream involves identifying a correspondence between the image features in each successive video frame from the first video frame through the intervening video frames to the second video frame.

4. The method recited in claim 1, wherein the filtered video stream is presented at an augmented reality or virtual reality device in communication with the electronic client device.

5. The method recited in claim 1, wherein the raw video stream includes spatial information selected from the group consisting of: depth information, visual flow between a plurality of viewpoints, and three-dimensional location information.

6. The method recited in claim 1, wherein the raw video stream includes scale information estimated using accelerometer information or inertial measurement unit (IMU) data.

7. An electronic client device comprising:
a communications interface that automatically transmits a first video frame in a raw video stream to a server via a communication network in response to determining the first video frame meets a designated criterion and receives from the server a filter processing message associated with the first video frame, the filter processing message including filter data for applying a filter to the first video frame, the raw video stream being captured live by the electronic client device; and
a processor that creates a filtered video stream in real time by applying the filter to a second video frame, wherein the first video frame precedes the second video frame in the raw video stream, wherein the filter is applied to the second video frame by propagating information from the first video frame to the second video frame based on the filter data, wherein the second video frame is neither transmitted to nor received from the server; and
a display screen that presents the filtered video stream live at the electronic client device;
wherein by applying the filter to the second video frame, the processor further:
identifies a first one or more image features in the first video frame via the processor at the electronic client device;
propagates the first one or more image features to the second video frame;
identifies a second one or more image features in the second video frame via the processor at the electronic client device; and
identifies a correspondence between the first one or more image features and the second one or more image features.

8. The electronic client device recited in claim 7, wherein the raw video stream is a camera view associated with a camera operating at the electronic client device.

9. The electronic client device recited in claim 7, wherein the processor further identifies a respective one or more image features in each of one or more intervening video frames, each of the intervening video frames temporally located between the first video frame and the second video frame in the video stream, wherein the correspondence between the first one or more image features and the second one or more image features comprises identifying a correspondence between the image features in each successive video frame from the first video frame through the intervening video frames to the second video frame.

10. One or more non-transitory computer readable media having instructions stored thereon for performing a method, the method comprising:
automatically transmitting, using an electronic device, a first video frame in a raw video stream from the electronic client device to a server via a communication network in response to determining the first video frame meets a designated criterion, the raw video stream being captured live by the electronic client device;
receiving, by the electronic client device, from the server a filter processing message associated with the first video frame, the filter processing message including filter data for applying a filter to the first video frame;
creating a filtered video stream in real time via a processor at the electronic client device by applying the filter to a second video frame, wherein the first video frame precedes the second video frame in the video stream, wherein the filter is applied to the second video frame by propagating information from the first video frame to the second video frame based on the filter data, wherein the second video frame is neither transmitted to nor received from the serve; and presenting the filtered video stream live at the client device presenting the filtered video stream live at the electronic client device;
wherein applying the filter to the second video frame comprises:
identifying a first one or more image features in the first video frame via the processor at the electronic client device;
propagating the first one or more image features to the second video frame;
identifying a second one or more image features in the second video frame via the processor at the electronic client device; and
identifying a correspondence between the first one or more image features and the second one or more image features.

11. The one or more non-transitory computer readable media recited in claim 10, wherein the raw video stream is a camera view associated with a camera operating at the electronic client device.

* * * * *